United States Patent
Kamimura et al.

(10) Patent No.: US 7,401,053 B2
(45) Date of Patent: Jul. 15, 2008

(54) ELECTRONIC INFORMATION CONTENT AUTOMATIC DISTRIBUTION SERVICE SYSTEM, INFORMATION PROCESSING APPARATUS, RECORDING MEDIUM, AND ELECTRICAL INFORMATION CONTENT AUTOMATIC DISTRIBUTION METHOD

(75) Inventors: Megumi Kamimura, Kanagawa (JP); Kazuhiro Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 681 days.

(21) Appl. No.: 10/019,135

(22) PCT Filed: Apr. 24, 2001

(86) PCT No.: PCT/JP01/03521

§ 371 (c)(1),
(2), (4) Date: Mar. 29, 2002

(87) PCT Pub. No.: WO01/82102

PCT Pub. Date: Nov. 1, 2001

(65) Prior Publication Data

US 2002/0107805 A1    Aug. 8, 2002

(30) Foreign Application Priority Data

Apr. 24, 2000    (JP) ............................. 2000-122543

(51) Int. Cl.
*G06F 17/00* (2006.01)

(52) U.S. Cl. .............................. 705/51; 705/1; 705/12; 705/50

(58) Field of Classification Search ................... 705/51, 705/1, 12, 50
See application file for complete search history.

(56) References Cited

U.S. PATENT DOCUMENTS

| 5,778,346 | A  | * | 7/1998  | Frid-Nielsen et al. ........... 705/9 |
| 5,996,007 | A  | * | 11/1999 | Klug et al. ................... 709/218 |
| 6,493,722 | B1 | * | 12/2002 | Daleen et al. ............. 707/104.1 |
| 6,601,041 | B1 | * | 7/2003  | Brown et al. .................. 705/14 |
| 6,603,857 | B1 | * | 8/2003  | Batten-Carew et al. ....... 380/44 |
| 2001/0047298 | A1 | * | 11/2001 | Moore et al. .................. 705/14 |
| 2001/0056374 | A1 | * | 12/2001 | Joao ........................... 705/14 |

* cited by examiner

*Primary Examiner*—Andrew J. Fischer
*Assistant Examiner*—John M. Winter
(74) *Attorney, Agent, or Firm*—Frommer Lawrence & Haug LLP; William S. Frommer; Thomas F. Presson

(57) ABSTRACT

An electronic information content automatic distribution service system according to the present invention is directed to a service system for automatically distributing electronic information contents based on a utilization contract made in advance between an information provider and a user. This system comprises: information distributing means for distributing electronic information contents to the user; and an information processing apparatus for receiving and processing electronic information contents distributed from this information distributing means. The information processing apparatus calls and connect the information distributing means at a preset first time. In addition, the apparatus receives and stores the electronic information contents from the information distributing means. Then, the apparatus reads out and displays the electronic information contents at a second time.

18 Claims, 11 Drawing Sheets

FIG. 9

PAYMENT METHOD

CARD OWNER'S NAME ☐

CREDIT CARD NUMBER ☐

VALIDITY ☐

[TRANSMIT]　　[CLEAR]

YEAR　MONTH　DATE　HOUR　MINUTES
☐　　☐　　☐　　☐　　☐

○ CONNECTION TIME
○ DISPLAY TIME

[STORE]　[CANCEL]　[APPLY]

P6

24

F I G. 1 4
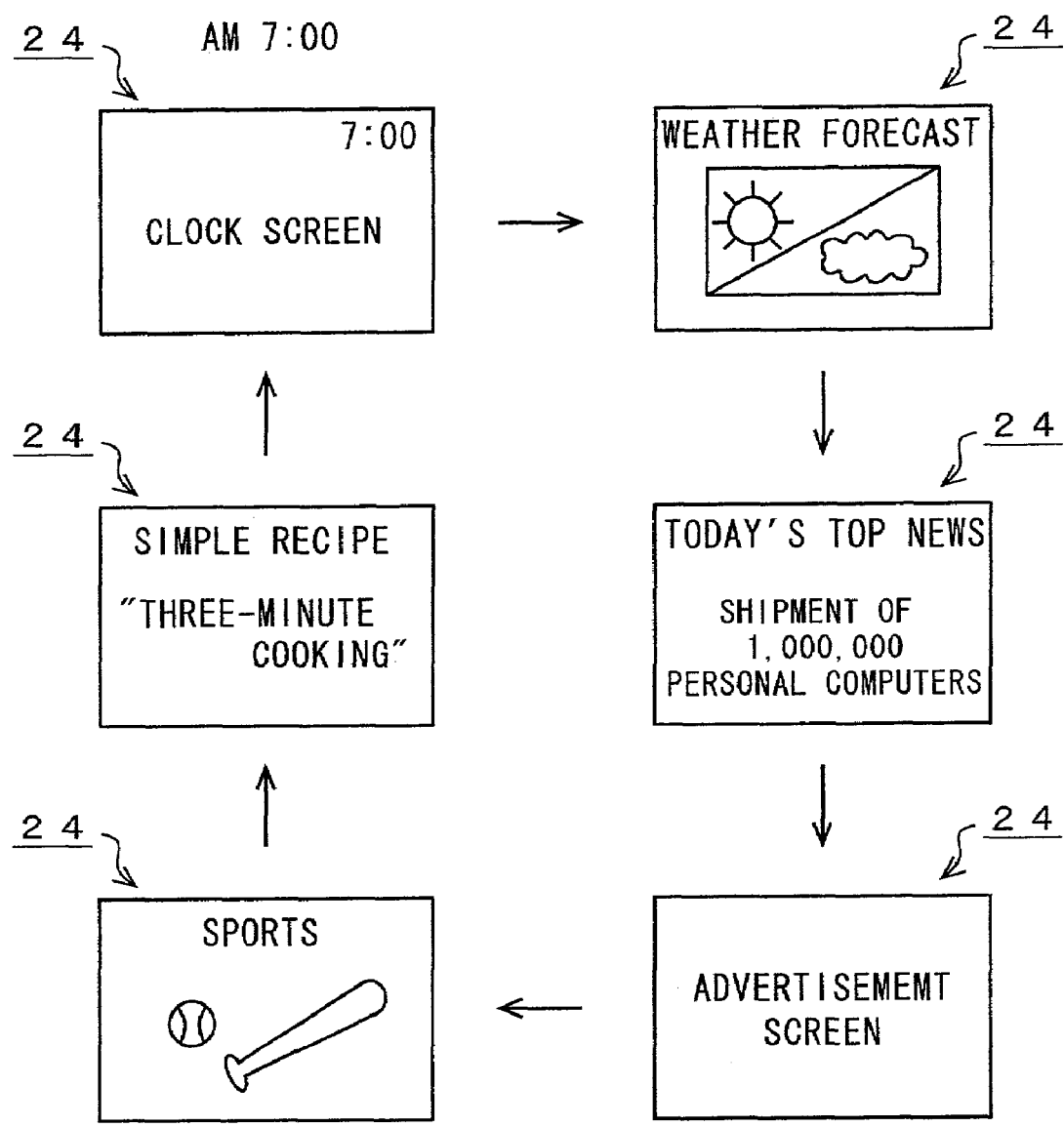

ELECTRONIC INFORMATION CONTENT AUTOMATIC DISTRIBUTION SERVICE SYSTEM, INFORMATION PROCESSING APPARATUS, RECORDING MEDIUM, AND ELECTRICAL INFORMATION CONTENT AUTOMATIC DISTRIBUTION METHOD

TECHNICAL FIELD OF THE INVENTION

The present invention relates to an electronic information content automatic distribution service system, an information processing apparatus, a recording medium, and an electronic information content automatic distribution method suitably applied to electronic content subscribing service business for periodically distributing electronic information contents such as news, weather forecast, traffic information, or cooking information and the like.

BACKGROUND ART

In recent years, with the development of communication means such as telephone lines, satellite communication lines, or Internet and information processing apparatuses such as personal computers or hand held telephone sets, in these information processing fields, there have been frequently used application software called Internet Boomerang or a home page automatic display function called Auto Navigation.

According this Internet Boomerang, in a database for previously registered Web pages or received mail or saved documents, when a keyword is input, target information is searched for, and is collected based on such keyword.

In addition, according to an Auto Navigation function, a user specifies a specific content supplier to a line connection service provider (provider) in advance, and always accesses only a home page of the content supplier. Through this access, the user's personal computer is guided to the home page of the content supplier that has been specified in advance, immediately after being connected to the provider.

In the meantime, according to a conventional method of distributing electronic information contents, for example, there has been employed a system of connecting a personal computer to a provider so that a user searches for, and obtains electronic information contents provided by a content provider in real time.

In this system, the Internet Boomerang or Auto Navigation function is utilized. However, in the case where the user attempts to see the latest electronic information contents in a desired category in advance one after another at any predetermined time, the user must input a keyword in order to search for a Web page every time a system startup screen is initiated. In addition, there is a problem that information other than electronic information contents required by the user is also displayed on a plurality of monitor screens.

There is an electronic content automatic distribution system for distributing newspaper scrap information or the like, called Internet FAX Service that applies such type of electronic information content automatic distribution method. There is a problem that pictures or characters are hardly identified because electronic information contents distributed by this system are monochrome display data.

DISCLOSURE OF THE INVENTION

An electronic information content automatic distribution service system is directed to a service system for automatically distributing electronic information contents based on a utilization contract made in advance between an information provider and a user, the service system comprising: information distributing means for distributing electronic information contents to a user; and an information processing apparatus for receiving and processing the electronic information contents distributed from this information distributing means, wherein this information processing apparatus calls and connects the information distributing means at a predetermined first time, and receives and stores the electronic information contents from the information distributing means, and then, reads out and displays the electronic information contents at a second time.

According to this electronic information content automatic distribution service system, in the case where electronic information contents are automatically distributed based on the utilization contract made in advance, there are set a first time that is a time for distributing electronic information contents and a second time that is a time for displaying the electronic information contents. Then, information distributing means is called at the first time to be connected to the user's information processing apparatus. At the same time, the electronic information contents from the information distributing means are received and stored by the information processing apparatus. Thereafter, when the second time has come, the electronic information contents are read out and displayed by the information processing apparatus.

Therefore, without depending on cumbersome input operation during system startup screen initiation or information search operation, the user can see the latest electronic information contents in a desired category in advance one after another at any predetermined time. In this way, this system can be constructed in an electronic content subscribing business model or the like for periodically distributing electronic information contents such as news, weather forecast, traffic information or cooking information and the like.

An information processing apparatus is directed to an apparatus for automatically receiving electronic information contents distributed from information distributing means based on a utilization contract made in advance between an information provider and a user, the apparatus comprising: a communication device for calling and connecting the information distributing means and for receiving the electronic information contents distributed from the information distributing means; a storage device for storing the electronic information contents received from the communication device; a display device for displaying the electronic information contents read out from the storage device; and a control device for controlling at least input and output of the communication device and display device, wherein the control device provides control so as to call and connect the information distributing means at a predetermined first time, and to receive and store the electronic information contents from the information distributing means, and then, read out and display the electronic information contents at a second time.

According to this information processing apparatus, in the case of automatically receiving the electronic information contents distributed from the information distributing means based on the utilization contract made in advance between the information provider and the user, for example, the first time that is a time for distributing electronic information contents and the second time that is a time for displaying the electronic information contents are set by operating means. First, the control device calls the information distributing means at the first time, and connects the means to the user's information processing apparatus. At the same time, the electronic information contents distributed from the information distributing means are received by the communication device, and the electronic information contents are stored in the storage device. Then, when the second time has come, the control device reads out the electronic information contents from the storage device so as to be displayed by the display device.

Therefore, without depending on cumbersome input operation during system startup screen initiation or information search operation and the like, the user can see the latest electronic information contents in a desired category in advance one after another at any predetermined time. In this way, this apparatus can be well applied to an electronic content subscribing business model or the like.

A recording medium is directed to a recording medium used in the case where arbitrary electronic information contents are automatically distributed from the information provider's information distributing means to the user's information processing apparatus, the recording medium having a program recorded therein, the program comprising: a first procedure concerning a utilization contract made in advance between the information provider and the user; a second procedure for setting a first time that is a time for receiving electronic information contents from the information distributing means and a second time that is a time for displaying electronic information contents by the information processing apparatus; and a third procedure for calling the information distributing means at the first time to be connected to the user's information processing apparatus, receiving and storing the electronic information contents from the information distributing means, and then, reading out and displaying the electronic information contents at the second time by the information processing apparatus.

According to the recording medium, without depending on cumbersome input operation during system startup screen initiation or information search operation and the like, the user's information processing apparatus can be operated so that the user can see and listen to the latest electronic information contents in a desired category in advance one after another at any predetermined time. In this way, this recording medium can be well applied to an electronic content subscribing business model or the like.

An electronic information content automatic distribution method is directed to a method for automatically distributing arbitrary electronic information contents from the information provider's information distributing means to the user's information processing apparatus, wherein a utilization contract is made in advance between the information provider and the user; there are at least set a first time that is a time for downloading electronic information contents from the information distributing means and a second time that is a time for displaying electronic information contents by the information processing apparatus; the information distributing means is called at the first time to be connected to the user's information processing apparatus, and the electronic information contents from the information distributing means are received and stored, and then, the electronic information contents are read out and displayed at the second time by the information processing apparatus.

According to the electronic information content automatic distribution method, without depending on cumbersome input operation during system startup screen initiation or information search operation and the like, in the user's information processing apparatus, the user can see and listen to the latest electric information contents in a desired category in advance one after another at any predetermined time. In this way, there can be constructed an electronic content prescribing business model for periodically distributing electronic information contents such as news, weather forecast, traffic information or cooking information.

BRIEF DESCRIPTION OF THE DRAWINGS

FIG. 9 is an imaginary view of the monitor 24 showing a display example of a payment method setting screen P5 when electronic content automatic service is utilized;

FIG. 10 is an imaginary view of the monitor 24 showing a display example of a startup time setting screen P6 when electronic content automatic distribution service is utilized;

FIG. 14 is an imaginary view of the monitor 24 showing an example of Web page automatic display.

BEST MODE FOR CARRYING OUT OF THE INVENTION

The present invention has been made to solve the foregoing conventional problems. It is an object of the present invention to provide an electronic information content automatic distribution service system, an information processing apparatus, a recording medium, and an automatic information content automatic distribution method so that a user can see and listen to the latest electronic information contents in a desired category in advance one after another at an always predetermined time, without depending on cumbersome input operation during system startup screen initiation or information search operation.

One embodiment of the electronic information content automatic distribution service system, information processing apparatus, recording medium, and electronic information content automatic distribution method according to the present invention, will be described with reference to the accompanying drawings.

(1) PREFERRED EMBODIMENTS

In the present embodiments, in the case of automatically distributing electronic information contents based on a utilization contract made in advance, there is provided an information processing apparatus for receiving and processing the electronic information contents, wherein information distributing means is called and connected at a predetermined first time. At the same time, electronic information contents from the information distributing means are received and stored, and then the electronic information contents are read out and displayed at a second time. In this way, a user can see and listen to the latest information contents in a desired category in advance one after another at any predetermined time, without depending on cumbersome input operation during system startup screen initiation or information search operation.

Figure 1:
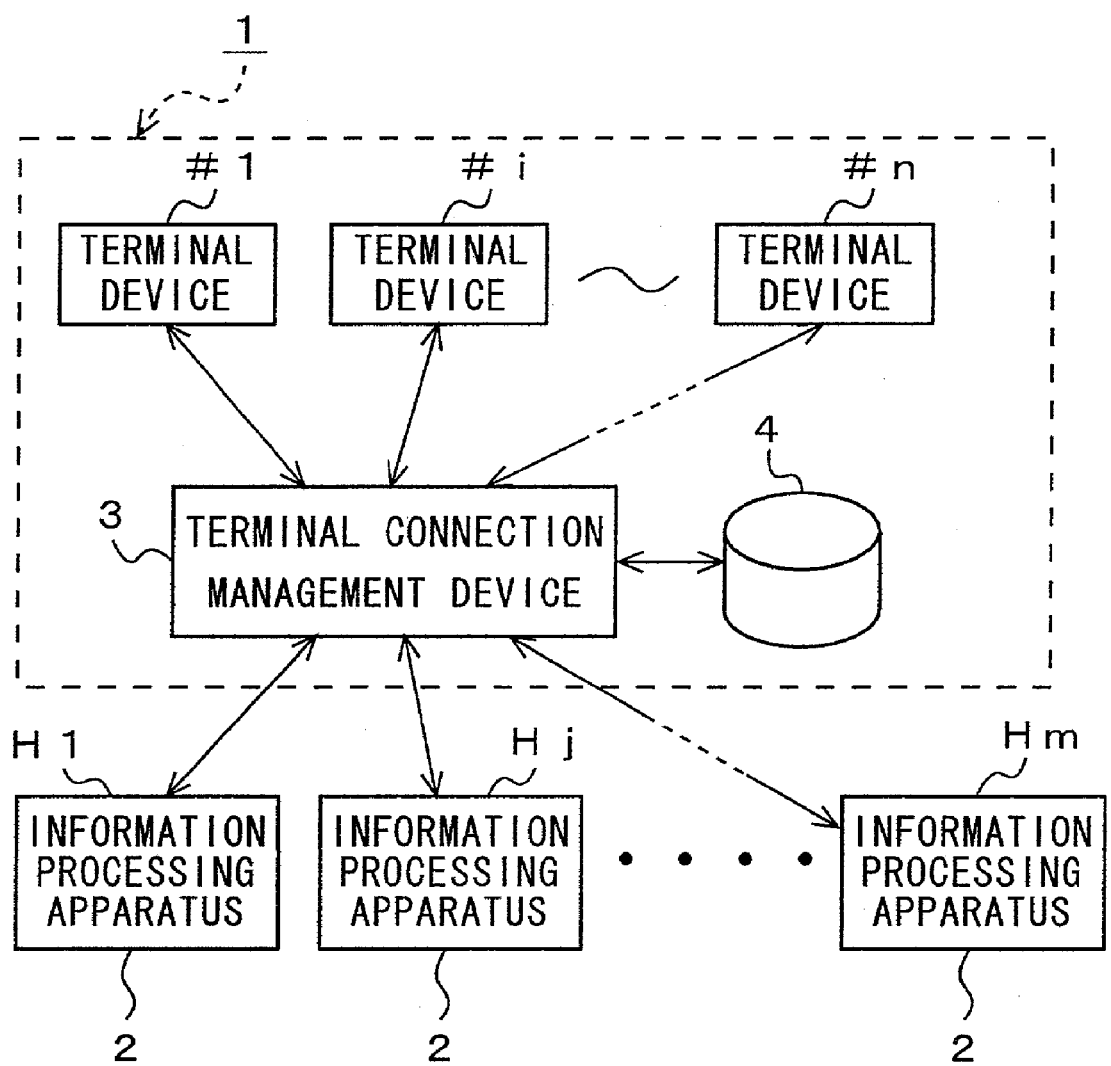
FIG. 1 is a block diagram depicting an exemplary configuration of an electronic information content automatic distribution service system according to one embodiment of the present invention.

An electronic information content automatic distribution service system 10 shown in FIG. 1 is directed to a service system in which utilization contracts are individually made in advance between an information provider and a plurality of users, and, based on this utilization contract, electronic information contents (hereinafter, referred to as electronic contents) are automatically distributed to these users. With respect to electronic contents available, there are news, politics, economy, society, weather forecast, traffic information, hobby information, business news, art & music, sport information and the like.

In this system 10, information distributing means 1 is provided so as to distribute electronic contents to a user. An information provider distributes the latest electronic contents always sequentially updated to the user. In this example, the information distributing means 1 comprises: a plurality of terminal devices #i (i=1 to n) for providing electronic contents in order to provide electronic contents to a user; and a terminal connection management device 3 for selecting the terminal devices #1 for providing electronic contents to be connected to the user's information processing device 2 based on the utilization contract.

The terminal device #i is set up for each content supplier, and a home page is opened at each content supplier. This home page includes news, politics, economy, society, weather forecast, traffic information, hobby information, business news, art & music, sport information and the like.

This terminal connection management device 3 is set up at a line connection service provider called "provider", and a utilization contract between a content supplier and the line connection service provider is made in advance with respect to use of electronic contents. A customer management database 4 is connected to this terminal connection management device 3 so as to record and store the user selected contents, the utilization charge payment method, or customer information such as customer's name, age, address.

This example assumes that advertisement information is distributed from the information distributing means 1 to the user's information processing apparatus 2 together with electronic contents. The advertisement information includes regionally limited advertisements concerning the user's habitual area. An advertiser pays an advertisement charge to the line connection service provider. This advertisement charge is included in the user's electronic content utilization charge, whereby a burden on utilization charge collected from the users may be reduced.

In addition, the user's information processing apparatuses 2 are individually connected through telephone lines or communication means such as Internet or satellite communication lines so as to receive and process the electronic contents distributed from the information distributing means 1. In each of the information processing apparatuses 2, the information distribution means 1 is called to be connected to the line connection service provider at a predetermined connection time (first time). In addition, electronic contents from the information distributing means 1 are received and stored, and then, when a display time (second time) has come, the electronic contents are read out and displayed.

Figure 2:
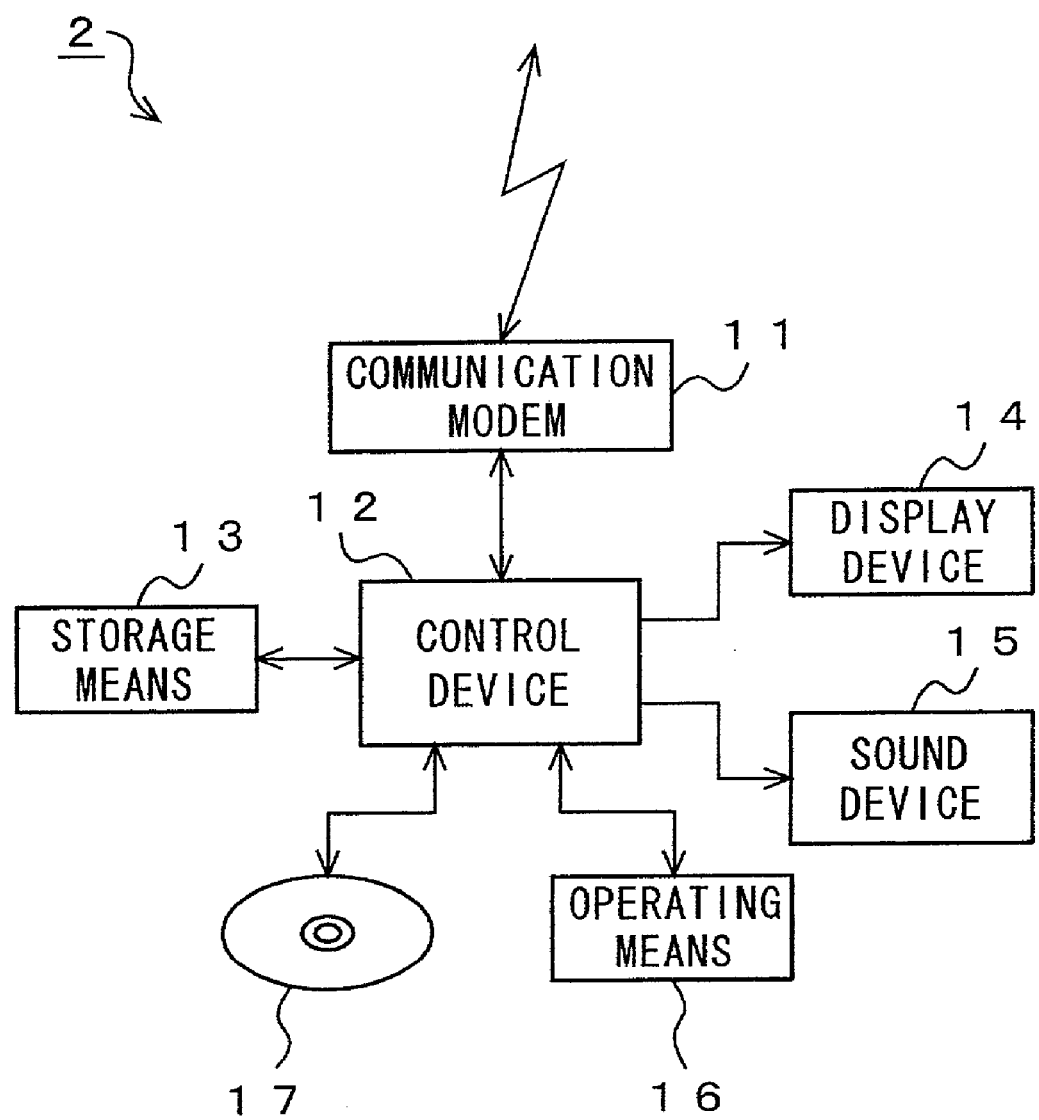
FIG. 2 is a block diagram depicting an exemplary configuration of an information processing apparatus 2 according to one embodiment of the present invention.

An information processing apparatus 2 shown in FIG. 2 comprises an automatic receiving function for automatically receiving electronic contents distributed from the information distributing means 1 based on a utilization contract made in advance between a user and a line connection service provider. For the information processing apparatus 2, there are used a desktop type personal computer with its communication function (hereinafter, simply referred to as personal computer), a notebook type personal computer, a hand held telephone set, and hand held terminal device.

Namely, the information processing apparatus 2 comprises at least a communication modem (communication device) 11. This communication modem may comprise a function for calling the information distributing means 1 to connect the information processing apparatus 2 to the line connection provider's terminal connection management device 3, and for receiving electronic contents distributed from the information distributing means 1.

A control device 12 such as CPU is connected to this communication modem 11, and further, a storage device 13 is connected to the control device 12. The storage device 13 is provided so as to store electronic contents received by the communication modem 11. For the storage device 13, there is used an always write and read enable memory (RAM) with its backup function. In addition, there is used a nonvolatile memory such as flash memory or a hard disk. An EEPROM built-in stick memory is used in a hand held device.

A display device 14 and a sound device 15 are further connected to this control device 12. The display device 14 is provided so as to display electronic contents read out from the storage device 13. In this example, a display repetition mode is preserved. When this mode is selected, even after a plurality of electronic contents have been displayed on the display device after one round, these electronic contents are repeatedly displayed.

In this example, the display device is provided so as to display a regionally limited advertisement concerning the user's habitual area together with electronic contents. A liquid crystal display monitor or cathode-ray tube (CRT) is used for the display device 14. The sound device 15 is provided so as to reproduce and output voice information added to the electronic contents read out from the storage device 13. A voice processing circuit or a speaker and the like is used for the sound device 15.

In addition, operating means 16 is connected to the control device 12. This operating means is operated so as to register a user in a line connection service provider when a utilization contract is made. Otherwise, the operating means 16 is provided so as to select a category of electronic contents by the user, and input the utilization charge payment method relevant to the automatic distribution service of the thus selected electronic contents.

Further, the operating means 16 is operated in order to set a display time (second time) for reading out and displaying electronic contents on the display device 14. When this display time is set, the control device 12 is provided to count back from this display time, obtain a connection time (first time) for calling information distributing means 1, and self-set this connection time.

Of course, the connection time may be manually set by using the operating means 16. In this case, a time zone recommended by the line connection service provider is specified. If a time following this time zone is specified, the latest electronic contents can be obtained. In this recommended time zone or earlier, there is a case in which electronic contents are not updated. In the case where the display times are overlapped by a plurality of users, the line connection service provider may adjust the connection time zone may be adjusted so as to prevent overlap of the connection times for calling the information distributing means 1.

A keyboard and a mouse or the like are used for this operating means 16. The control device 12 is provided so as to control an input and output of the communication modem 11, storage device 13, display device 14, and sound device 15 based on the operating means 16 operated by the user. In this control device 12, the information distributing means 1 is called at a time for connection to the line connection service provider preset by the operating means 16 to connect the information processing apparatus 2 to the terminal connection management device 3, and the electronic contents from the terminal device #i of the content supplier are received and stored through this terminal connection management device 3. Then, control is performed such that the electronic contents from the storage device 13 are read out at a preset display time, and are displayed on the display device 14. A timer monitors whether or not this connection time has come by means of the control device 12, and the time and the preset connection time are compared with each other. By this detection of coincidence, it is judged that the connection time has come.

Upon this control, for example, a recording medium 17 is set to the control device 12 when a utilization contract is made so as to operate this control device 12 with high reproducibility. The recording medium 17 is sold and distributed in the form of CD-ROM or the like. An automatic browsing application is described in the CD-ROM. This automatic browsing application serves as a control program in which a timer function, automatic connection and automatic disconnection functions for the line connection service provider, electronic content download function and its automatic display function are integrated with each other in one software component. This automatic browsing application may be provided by the line connection service provider. This is because this automatic browsing application can be distributed to each user for free by utilizing a network.

This recording medium 17 records a control program comprising: a first procedure concerning a utilization contract made in advance between a line connection service provider and a user; a second procedure for setting a connection time for downloading electronic contents from a terminal connection management apparatus 3 and a display time for displaying the electronic contents by an information processing apparatus 2; and a third procedure for calling the information distributing means 1 at the connection time to connect the terminal connection management device 3 to the user's information processing apparatus 2, and receiving and storing the electronic contents from the terminal connection management device 3, and then, reading out and displaying the electronic contents at the display time by the information processing apparatus 2.

The first procedure includes the steps of registering the user to the line connection service provider; selecting the category of electronic contents by the user; and inputting a method for paying a utilization charge according to electronic content automatic distribution service. This control program may be installed from the line connection service provider when a utilization contract is made for the electronic content automatic distribution service. This is because the line connection service provider comprises a recording medium (automatic browsing application) 17.

According to this automatic browsing application, without depending on cumbersome input operation during system startup screen initiation or information search operation, the control device 12 can be operated so that the user can see and listen to the latest electronic contents in a desired category in advance one after another at any predetermined time.

Now, an electronic content automatic distribution method according to the preferred embodiment of the present invention will be described here. This example presumes a case in which a content supplier's terminal device #i automatically distributes arbitrary electronic contents to the user's information processing apparatus 2 trough the line connection service provider's terminal connection management device 3. In addition, it is presumed that the recording medium 17 is mounted on the control device 12, since the automatic browsing application is installed from the recording medium 17.

Figure 3:
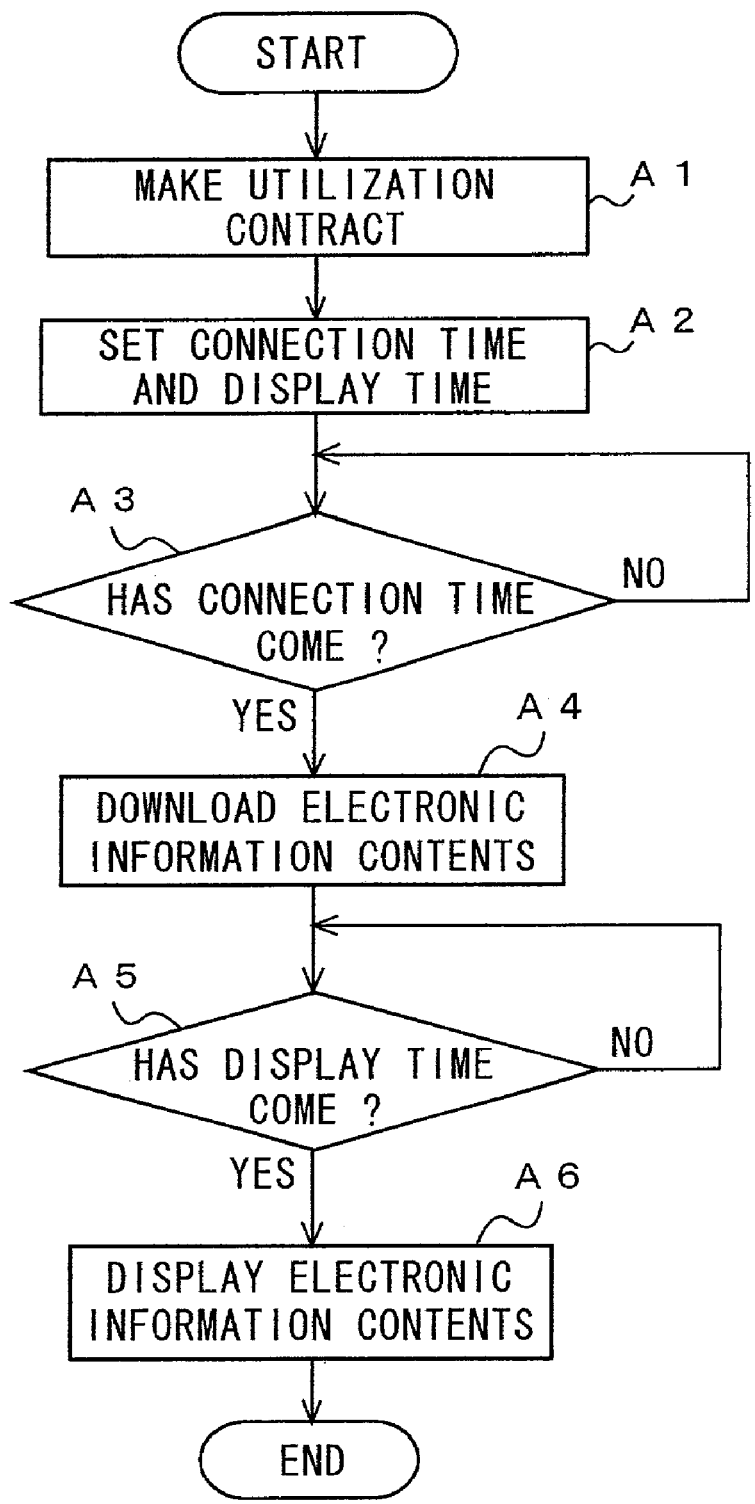
FIG. 3 is a flow chart showing an example of processing in an electronic content automatic distribution service system 10.

With these being presumed, at the step A1 in the flowchart shown in FIG. 3, a utilization contract is made between the line connection service provider and the user. This utilization contract is made through a communication line. At this time, the user is registered in the line connection service provider in accordance with the first procedure of the recording medium 17. The category of electronic contents are selected by this user, and a method for paying the utilization charge according to the electronic content automatic distribution service is input by using the operating means 16. The customer's data such as thus obtained user's name, age or address is registered in the database 4 in the line connection service provider.

Then, at the step A2, there are set a connection time for downloading electronic contents from the information distributing means 1 and set a display time for displaying electronic contents by the information processing apparatus 2. At this time, in the control device 12, in accordance with the second procedure of the recording medium 17, the connection time and display time are set by using the operating means 16.

Then, at the step A3, it is judged by the control device 12 whether or not a time for connection to the line connection service provider has come. As to whether or not the connection time has come, the current time is monitored by the control device 12, and the current time and the preset connection time are compared with each other. By this coincidence detection, it is judged that the connection time has come. In the case where the current time has not reached the connection time, a timer or the like is continuously monitored by the control device 12.

Therefore, in the case whether the time for connection to the line connection service provider has come, it goes to the step A4 at which the terminal connection management device 3 is called to be connected to the user's information processing apparatus 2. At the same time, the electronic contents distributed from the content supplier's terminal device #i through the terminal connection management device 3 are received by the connection modem 11 of the information processing apparatus 2, and the electronic contents are stored in the storage device 13.

Then, at the step A5, it is judged whether or not the display time for the display device 14 has come by the control device 12. At this time, in the control device 12, the current time is monitored in accordance with the third procedure of the recording medium 17, and the current time and the preset display time are compared with each other. By this coincidence detection, it is judged that the display time has come.

When the current time reaches the display time, at the step A6, the control device 12 is provided so as to read out electronic contents from the storage device 13, and display the contents on the display device 14. If the current time does not reach the display time, a timer or the like is monitored by the control device 12.

Therefore, without depending on cumbersome input operation during system startup screen initiation or information search operation and the like, the user can see the latest electronic contents in a desired category in advance on the display device 14 at any predetermined time. In this manner, there can be constructed electronic content subscribing business model or the like for periodically distributing electronic contents such as news, weather forecast, traffic information or cooking information.

(2) EMBODIMENTS

In this example, in the case where Web pages caused by the content supplier is provided to the user, irrespective of an initial screen caused by the browser of the user's information processing apparatus 2, a Web page (may be plural) in a category registered in advance is browser initiated at the user specified display time, and then, the Web page(s) can be displayed immediately on the display device.

Figure 4:
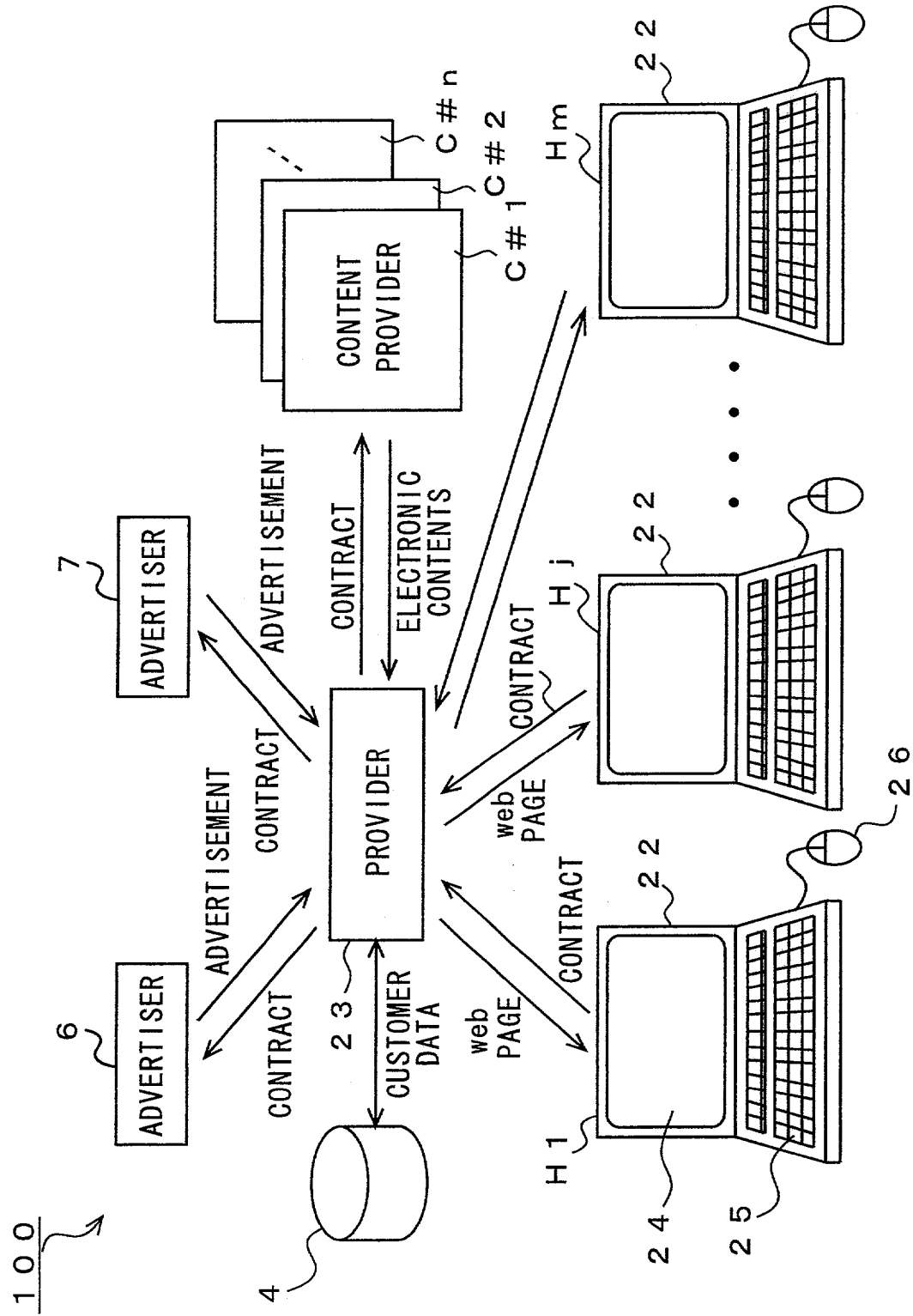
FIG. 4 is a block diagram depicting an exemplary configuration of an electronic content subscribing service system 100 with its advertisement according to one embodiment of the present invention.

An electronic content subscribing service system 100 with advertisement shown in FIG. 4 is directed to a service system for making utilization contract individually in advance between a provider 23 and a plurality of users Hj (j=1 to m), and automatically distributing to these users Hj electronic contents (hereinafter, referred to as Web pages) such as news, politics, economy, society, weather forecast, traffic information, hobby information, business news, art & music, or sport information based on this utilization contract.

In this system 100, a provider 23 is provided so as to distribute Web pages to the user Hj. The provider 23 distributes the latest Web pages updated sequentially to the user Hj. In this example, the provider 23 always utilizes contents from the content supplier other than its own contents. For example, a utilization contract is made between the provider 23 and a plurality of content providers C#i (i=1 to n) with respect to use of Web pages such as news, politics, economy, society, weather forecast, traffic information, hobby information, business news, art & music, or sport information.

At the provider 23, there is provided a terminal connection management device as described in FIG. 1. At the content providers C#i as well, there are provided terminal devices as described in FIG. 1. At the provider 23, there is provided a customer management database 4 so as to record and store contents selected by the user Hj, the utilization charge payment method, customer information such as the customer's name, age, address, password, E-mail address or the like.

A notebook type personal computer 22, for example, is provided to the user Hj, and subscription conditions or the like are set by operating a input tool 25 and a mouse 26 when a contract is made for utilization of the electronic content subscribing service system 100. During automatic browsing, the Web pages caused by each content supplier are provided so as to be automatically displayed on the monitor 24 without these operations.

In addition, the provider 23 distributes to the personal computer 22 of the user Hj a regionally limited advertisement concerning the habitual area of the user Hj together with the Web pages. For example, advertisement information concerning super-discount sales campaign such as major supermarket in an area to which the provider 23 belongs is distributed in the form such that the information is inserted between the Web pages. In an example shown in FIG. 4, the supermarkets that are advertisers 6 and 7 of two shops pay advertisement charges to the provider 23. This advertisement charge is included in the Web page utilization charge of the user Hj so as to reduce a burden on the utilization charge collected from the user Hj.

In addition, the personal computers 22 of the users Hj are individually connected to the provider 23 through telephone lines or communication lines such as Internet or satellite communication lines so as to receive and process the Web pages distributed from this provider 23. At the personal computer 22 of each user Hj, the provider 23 is called and connected at a predetermined connection time (first time), and the Web pages from this provider 23 are received and stored. Then, when the display time (second time) has come, the Web pages are read out and displayed.

Figure 5:
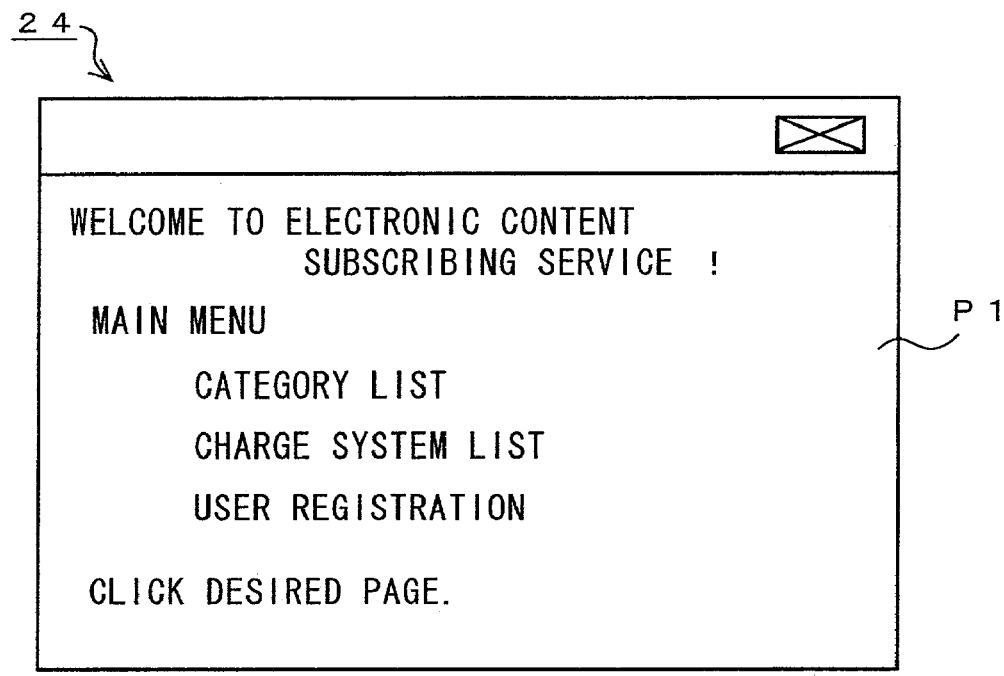
FIG. 5 is an imaginary view of a monitor 24 showing a display example of a main menu screen P1 when a utilization contract is made.

Now, a display example of the monitor 24 when a utilization contract is made for the electronic content subscribing service system 100 will be described with reference to FIG. 5 to FIG. 10. A main menu screen P1 shown in FIG. 5 is provided by the provider 23, and is first displayed when a setting application is initiated during the utilization contract of the system 100. On this screen P1, character information "Welcome to electronic content subscribing service system!" is displayed, and selections "category list", "charge system list" and "user registration" are provided as the main menu.

Guide information "Click desired page" is displayed at the lower part of these selections. When the system 100 is used, "User registration" is selected. A mark "X" at the upper right corner in this screen P1 denotes an icon "Close".

Figure 6:
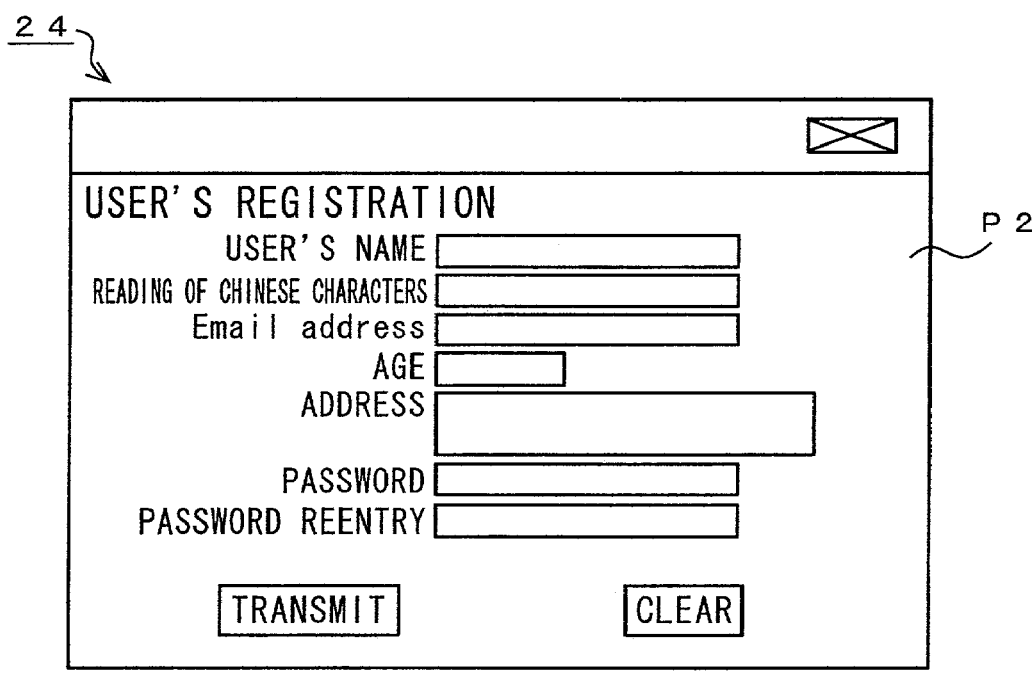
FIG. 6 is an imaginary view of the monitor 24 showing a display example of a user registration screen P2 when the utilization contact is made.

A user registration screen P2 shown in FIG. 6 is displayed when "user registration" is selected on the main menu screen P1 shown in FIG. 5. On this screen P2, entry fields concerning user registration entries such as "user's name", "furigana (reading of Chinese characters)", "E-mail address", "age", "address", "password", "password reentry" are shown with these fields being blanked. Password is provided to make entry for authentication.

At the lower part of these entries, operation icons such as "Transmit" and "Clear" are displayed. The user is prompted to enter necessary items into these entry fields by using the input tool 25, and then, click "Transmit". This is because user registration information is transmitted to the provider 23. If an incorrect entry is made, "Clear" is clicked. The mark "X" at the upper right of this screen P2 is provided so as to be clicked when the previous screen P1 is restored.

Figure 7:
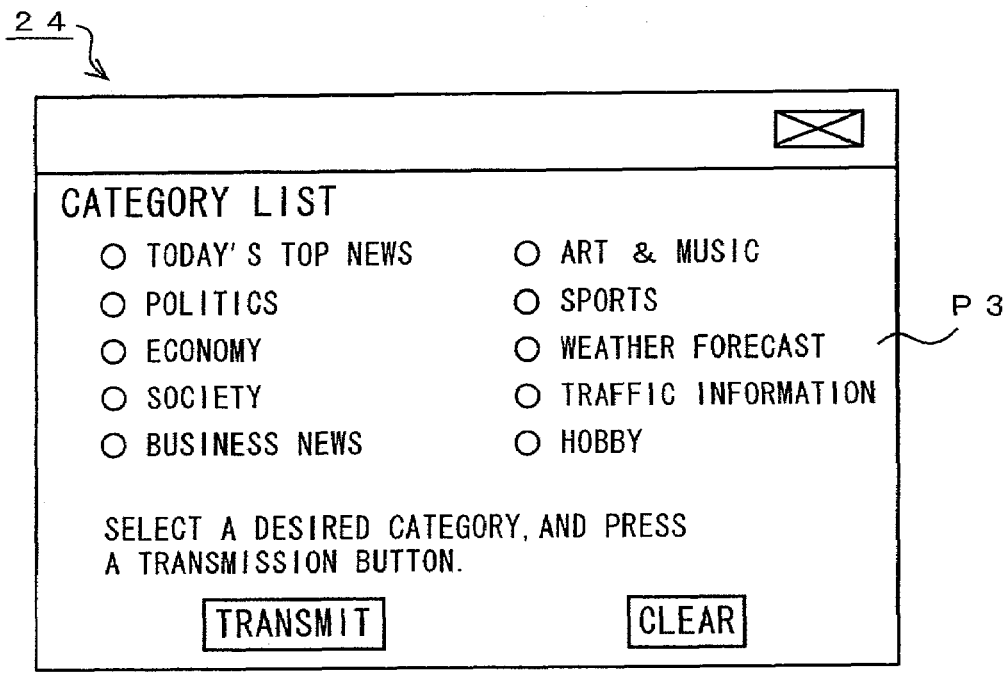
FIG. 7 is an imaginary view of the monitor 24 showing a display example of the category selection screen P3 when the utilization contract is made.

A category selection screen P3 shown in FIG. 7 is displayed sequentially after "Transmit" has been clicked on the user registration screen P2 shown in FIG. 6. On this screen P3, the category is hierarchically classified in the form of major, middle, and minor classifications. In this example, on the screen P3, there are displayed a list of categories including selections concerning "Today's Top news", "politics", "economy", "society", "business news", "art & music", "sport", "weather forecast", "traffic information" and "hobby".

At the lower part of these selections, there is displayed guide information "Select a desired category, and click a transmission button". Of course, it is possible to select all the categories. At the lower part of this guide display field, operation icons "Transmit" and "Clear" are displayed. The user can select a desired category from among these categories. After the user has selected the desired category, the user is prompted to click "Transmit". This is because the category selection information is provided to the provider 23. If the user mistakenly made a selection, "Clear" is clicked. To restore the previous screen P2, the user is prompted to click the mark "X" at the upper right of this screen P3.

Figure 8:
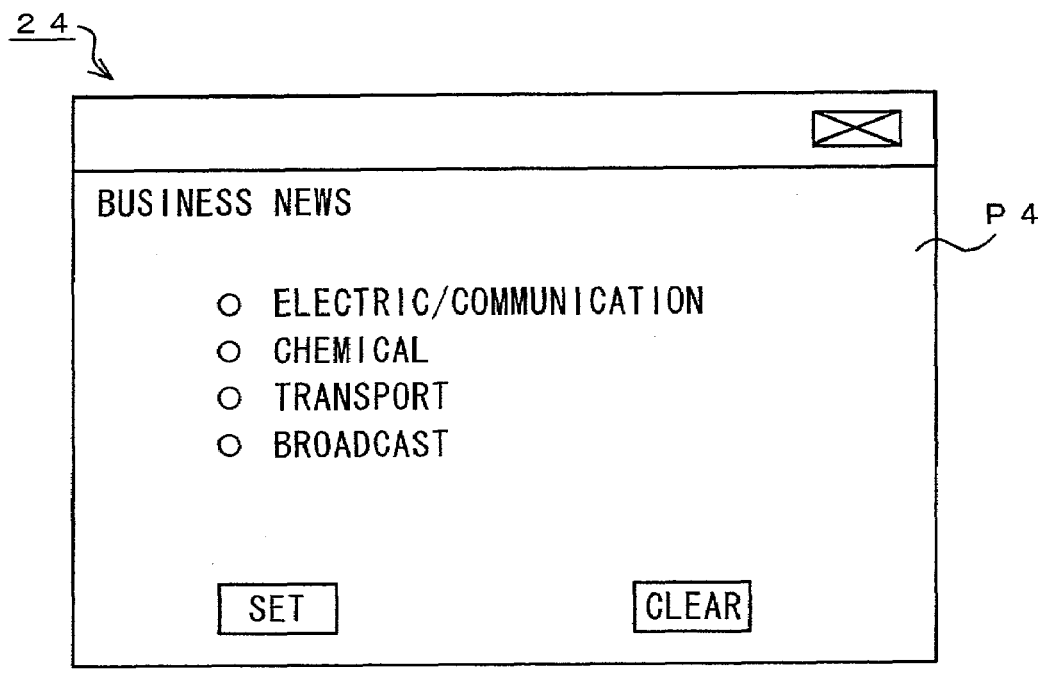
FIG. 8 is an imaginary view of the monitor 24 showing a display example of a category detail screen P4 that is a lower hierarchy of the category selection screen P3.

On a category detail screen P4 shown in FIG. 8, when the user select any one category on the category selection screen P3 shown in FIG. 7, the categories provided as its lower hierarchy are displayed. In this example, on the category selection screen P3 shown in FIG. 7, selections concerning "Electronic/Communication", "Chemical", "Transport", "Broadcast" are displayed as categories provided as its lower hierarchy.

At the lower part of this selection display field, operation icons "Transmit" and "Clear" are displayed. The user can set a desired category from these selections. After the desired category has been determined, the user is prompted to click "Set". This is because genre setting information is transmitted to the provider 23. If an incorrect setting is done, "Clear" is clicked. To restore the previous screen P3, the user is prompted to click the mark "X" at the upper right of this screen P4.

FIG. 9 is an imaginary view of the monitor 24 showing a display example of a payment method setting screen P5 during utilization of electronic content automatic distribution service. The payment methods for this electronic content automatic distribution service include a plurality of settlements such as credit card or invoice payment. This example shows a case in which a credit card is selected.

The payment method setting screen P5 shown in FIG. 9 is displayed sequentially after "Set" has been clicked on the category detail screen P4 shown in FIG. 8. On this screen P5, entry fields concerning "Card owner's name" "Credit number" and "Validity" are blanked as payment methods.

At the lower part of these entry fields, operation icons "Transmit" and "Clear" are displayed. The user is prompted to enter necessary items into these entry field by using the input tool 25, and then, click "Transmit". This is because setting information concerning the payment method during the service utilization is provided to the provider 23. If an incorrect entry is made, "Clear" is clicked. To restore the previous screen P4, the user is prompted to click the mark "X" at the upper right of this screen P5.

On these screens P1 to P5, a utilization contact can be made between the provider according to electronic content automatic distribution service and the user. This utilization contract completes at a time when the setting information concerning user registration information, category selection information, genre setting information and payment method is transmitted to the provider 23.

In addition, a startup time setting screen P6 shown in FIG. 10 is displayed sequentially after "Transmit" has been clicked on the payment method setting screen P5 shown in FIG. 9. On this screen P6, entry fields for "year", "month", "date", "hour", "minutes"and "display time" are blanked as a time for starting up the user's personal computer 22. Selections "connection time" and "display time" are displayed at the lower part of these entry fields.

When the "connection time" has been selected, the user's personal computer 22 is started up, and a first time for connection to the provider 23 is set. This connection time is selected from among the recommended time zones by the provider 23. When "display time" has been selected, the user's personal computer 22 is operated, and a second time for displaying Web pages on the monitor 24 is set. This display time is analogous to a timer set alarm clock.

In this example, only the "display time" is set so that the "connection time" may be set by using the function of the personal computer 22. For example, when the "display time" is set, the personal computer 22 is provided to count back from this display time, obtain a connection time (first time) for calling and connecting to the provider 23, and self-set this connection time.

At the lower part of these entry fields, operation icons "Store", "Cancel", and "Apply" are displayed. The user is prompted to enter necessary items into these fields by using the input tool 25, and then, click "Store" and "Apply". If an incorrect entry is made, "Cancel" is clicked. After the "Store" and "Apply" have been clicked, for example, a display example of the main menu screen P1 is restored.

Now, a Web page automatic distribution method according to embodiments of the present invention will be described here.

EXAMPLE OF PROCESSING WHEN A UTILIZATION CONTRACT IS MADE

This example presumes a case in which, during utilization contact setting of the system 100, an automatic browsing application is installed in a hard disk in a personal computer 22 from a recording medium 17 (hereinafter, referred to as CD-ROM) set to the user's personal computer 22 or a provider 23 through a network. In addition, for a payment method for electronic content automatic distribution service, a case of settlement using a credit card is shown as an example.

Figure 11:
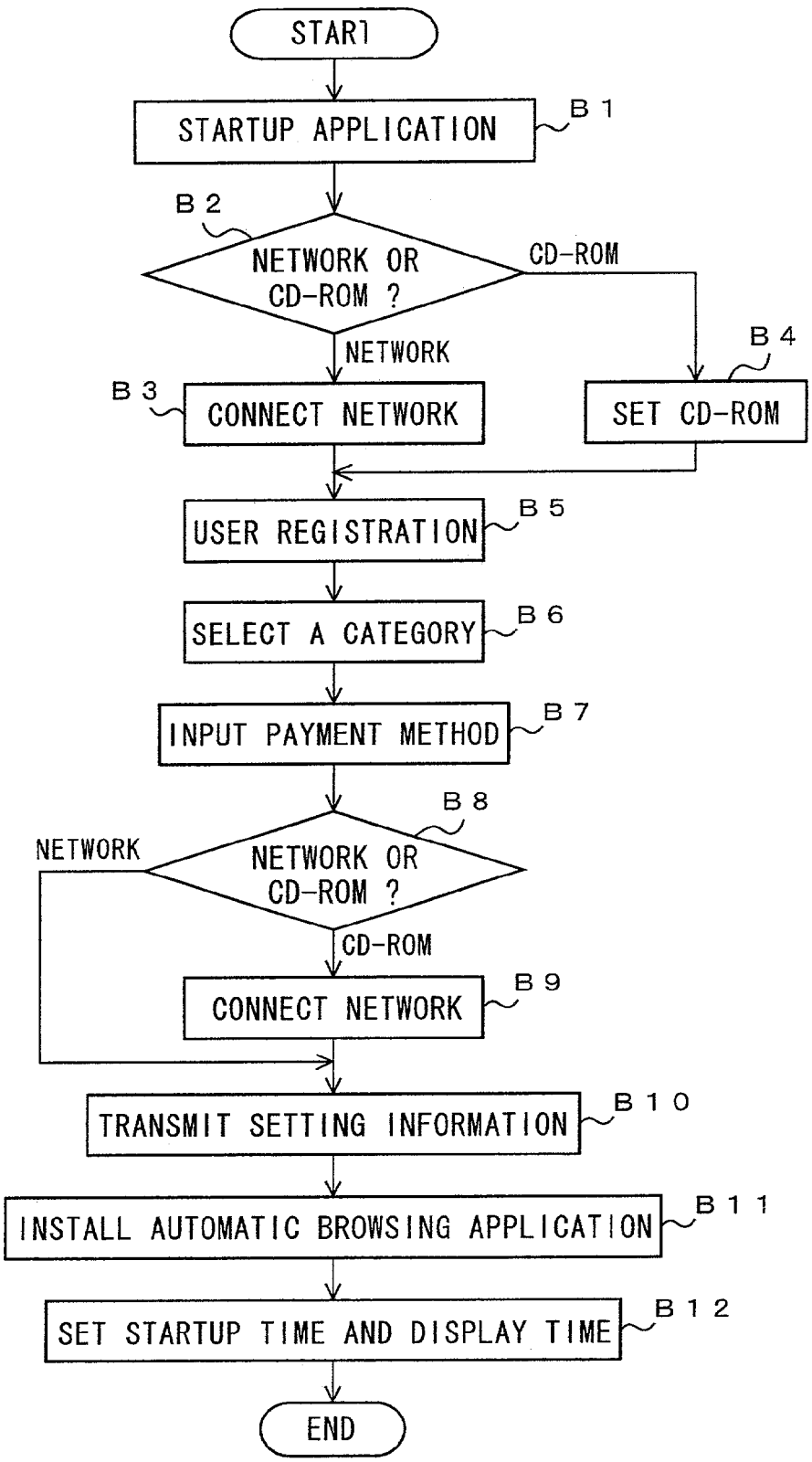
FIG. 11 is a flow chart showing an example of processing when a utilization contract is set in an electronic content automatic distribution service system 100.

With this being presumed, at the step B1 in the flow chart shown in FIG. 11, a user starts up the personal computer 22, and initiates a setting application. Then, at the step B2, the user determines whether the automatic browsing application is installed from a CD-ROM or from the provider 23 through a network. In the case where the above application is installed through the network, the personal computer is connected to the network to call the provider 23 at the step B3. In the case where the application is installed from the CD-ROM, the CD-ROM is mounted on the personal computer 22 at the step B4.

Then, in order to make a utilization contract between the provider 23 and the user, the user is user-registered in the provider 23 in accordance with the first procedure of the CD-ROM at the step B5. Here, the main menu screen P1 shown in FIG. 5 is displayed on the monitor 24. On this screen P1, character information "Welcome to electronic content subscribing service system!" is displayed, and selections "category list", "charge system list", and "user registration" are displayed as a main menu. The user selects the "user registration".

As a result, the display is changed from the main menu screen P1 to the user registration screen P2 shown in FIG. 6. On this screen P2, entry fields concerning "user's name", "furigana (reading of Chinese characters)", "Email address", "age", "address", "password", and "password reentry" are blanked as user registration items. Therefore, the user enter necessary items into these entry fields by using the input tool 25 or mouse 26, inputs the "password", and then, clicks "Transmit". In this way, the user registration information is provided, and the display is changed from the user registration screen P2 to the category selection screen P3 shown in FIG. 7. The user registration information is temporarily registered in a memory in the personal computer 22.

Then, processing goes to the step B6 at which the field of Web page is selected by the user. Here, on the category selection screen P3, there are displayed selections concerning category listings "Today's Top News", "Politics", "Economy", "Society", "Business news", "Art & Music", "Sports", "Weather Forecast", "Traffic information" and "hobby". In this example, the user selects the "business news", and clicks "Transmit". In this way, the display is changed to the category detail screen P4 shown in FIG. 8, the screen being a lower hierarchy of the category selection screen P3.

On this category detail screen P4, there are displayed selections concerning "Electrical/Communication", "Chemical", "Transport", and "Broadcast". When a desired genre is selected, the user clicks "Set". In this way, category selection information and genre setting information are provided, and the display is changed from the category detail screen P4 to the payment method setting screen P5 shown in FIG. 9. The category selection information and genre setting information are temporarily recorded in a memory in the personal computer 22.

Then, processing goes to the step B7 at which a method of paying a utilization charge according to Web page automatic distribution service is input by using the inputting tool 25 or mouse 26. Here, on the payment method setting screen P5, all the entry fields concerning "card owner's name", "credit number", and "Validity" are blanked as a payment method. The user enters necessary items into the above described entry fields by using the input tool 25. Then, the user clicks "Transmit". In this way, the setting information concerning a payment method during service utilization is provided, and the setting information is temporarily registered in the personal computer 22.

Then, at the step B8, it is judged whether an automatic browsing application is installed from the CD-ROM or from the provider 23 through a network. In the case where the above application is installed through the network, it means that the personal computer 22 has already been connected to the provider 23, and processing goes to the step B10.

In the case where the application is installed from the CD-ROM, the user registration information, category selection information, genre setting information and setting information concerning the payment method or the like are transmitted to the provider 23 at present. Then, processing goes to the step B9 at which the personal computer 22 is connected to a network to call the provider 23. At the step B3, in the case where the personal computer 22 is connected to the network to make a utilization contrast, this step B9 is passed.

Then, processing goes to the step B10 at which these items of setting information concerning user registration information, category selection information, genre setting information and payment method or the like are transmitted to the provider 23. The thus obtained items of setting information concerning user registration information, category selection information, genre setting information and payment method are registered in customer management database 4 in the provider 23.

At the step B11, the automatic browsing application is installed in a hard disk of the personal computer 22. When this installation terminates, and "Transmit" is clicked on the payment method setting screen P5, the display is changed to the startup time setting screen P6 shown in FIG. 10. Therefore, at the step B12, there are set a connection time for downloading Web pages from the provider 23 and a display time for displaying Web pages by the personal computer 22. At this time, in the personal computer 22, in accordance with the second procedure described in the CR-ROM, the connection time and display time are set by using the input tool 25 or mouse 26.

On the startup time setting screen P6 shown in FIG. 10, the entry fields "Year", "Month", "Date", "Time", and "Minutes" are blanked as a time for starting up the user's personal computer 22. Here, in the case where the user selects the "connection time", the personal computer 22 is started up, and the first time for connection to the provider 23 is set. This connection time is selected from among the recommended time zone of the provider 23. In the case where the "display time" has been selected, the user's personal computer 22 is operated, and the second time for displaying Web pages is set on the monitor 24. Then, the user clicks "Store" and "Apply".

In this way, according to an example of processing when a utilization contract is set in the Web page automatic distribution service system 100, the utilization contract can be made between the provider 23 and the user on the main menu screen P1, user registration screen P2, category selection screen P3, category detail screen P4 and payment method setting screen P5. In addition, the utilization contract can be completed at a time when the setting information concerning user registration information, category selection information genre setting information and payment method is transmitted to the provider 23.

EXAMPLE OF PROCESSING DURING AUTOMATIC BROWSING

This example presumes a case in which at least a display time is set to AM 7:00, Apr. 1, 1999, a connection time is self set by a personal computer 22 by counting it back from the display time, and the personal computer 22 is activated at a startup time that is further counted back from this connection time. Of course, the personal computer 22 is connected to the telephone lines.

Web pages downloaded from the provider 23 includes advertisement and notice from the provider 23 as well as those selected by the user during utilization contract. The user pre-selected category includes "weather forecast", "Today's Top news", "sport information" and "simple recipe".

Figure 12:
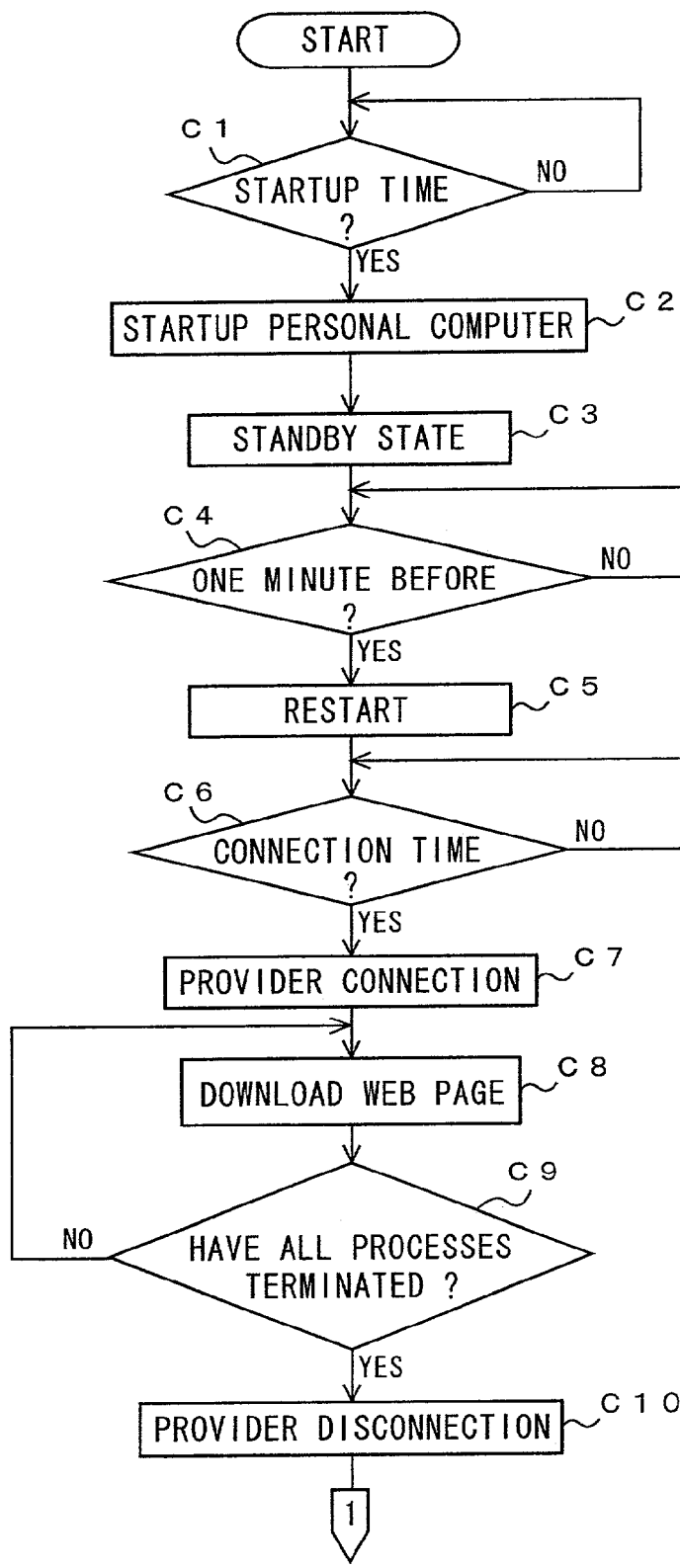
FIG. 12 is a flow chart showing a first example of processing during Web page automatic browsing.
Figure 13:
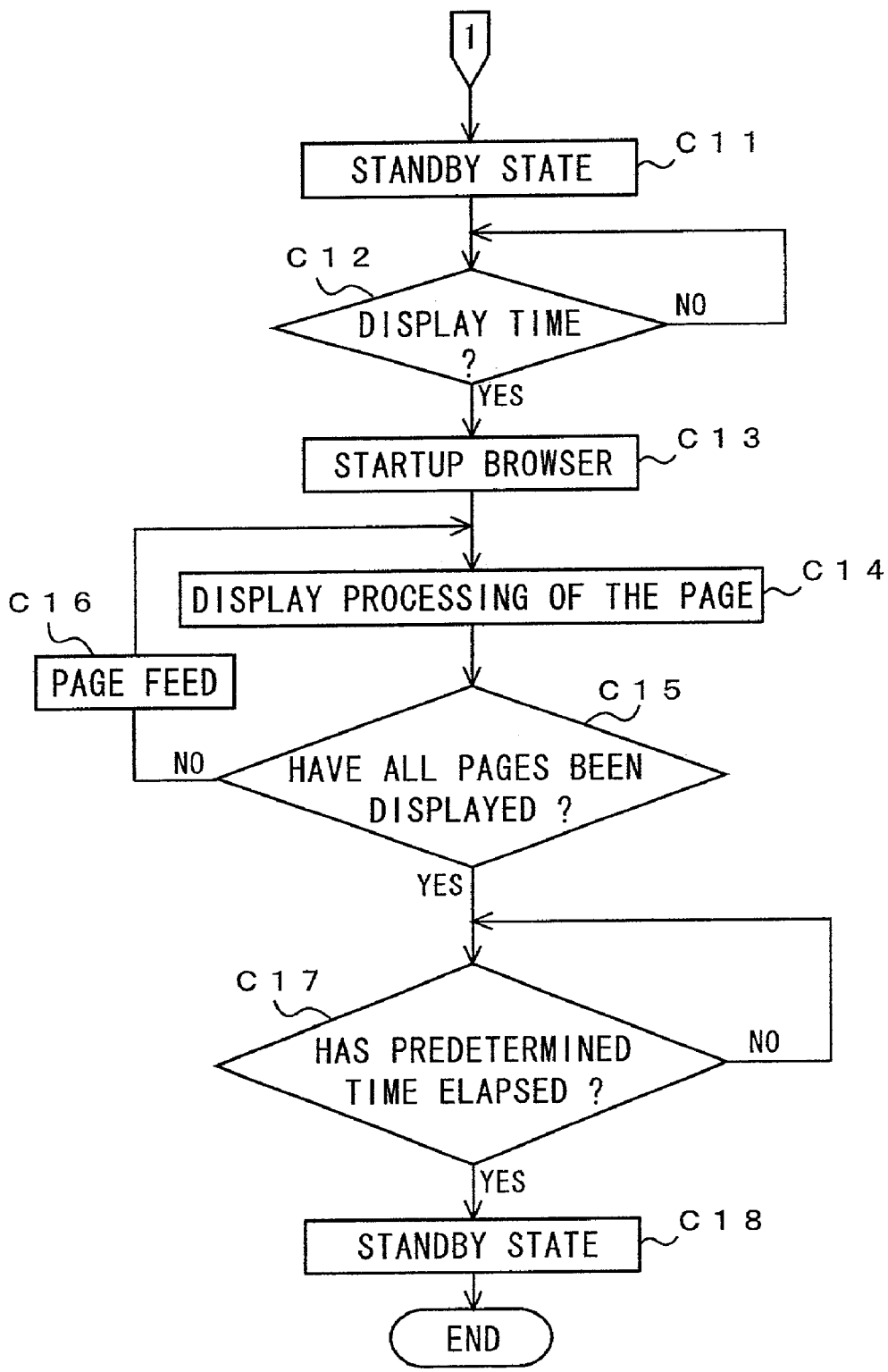
FIG. 13 is a flow chart showing a second example of processing during Web page automatic browsing.

With this being presumed, whether or not there has come a startup time that is self set by counting it back from the display time by the personal computer 22 is detected at the step C1 in the flow chart shown in FIG. 12. In the case where the startup time has come, the personal computer 22 is started up at the step C2, and an automatic browsing application is initiated. After this automatic browsing application has been initiated, processing goes to the step C3 at which the personal computer 22 enters a standby state. This standby state denotes a mode in which, while the personal computer 22 is powered ON, a peripheral circuit other than control device 12 shown in FIG. 2 is powered OFF. In this mode, in order to suppress power consumption of the personal computer 22, the control device 12 such as CPU operates in a sleeve state in which an external trigger is acceptable.

Then, at the step C4, whether or not the current time has reached one minute before a preset connection time is detected by means of the control device 12. In the case where the current time has reached one minute before the connection time, the control device 12 operating in the sleep state receives a trigger from a timer IC, and the personal computer 22 is restarted at the step C5. Then, at the step C5, whether or not the current time has reached the preset connection time is detected by means of the control device 12. In the case where the current time has reached the connection time, processing goes to the step C6 at which a communication modem 11 of the personal computer 22 is connected to the terminal connection management device 3 of the provider 23. Through this terminal connection management device 3, connection to the content supplier's terminal device #i is made.

When connection between the provider 23 and the personal computer 22 completes, processing goes to the step C8 at which data concerning Web pages registered in the provider 23 starts downloading. Here, Web pages to be downloaded include advertisements, notice from the provider 23 as well as those selected when a utilization contract is made. Web pages distributed from the content supplier's terminal device #i through the provider 23 are received by the communication modem 11 of the personal computer 22, and the Web pages are stored in the storage device 13.

Then, at the step C9, whether or not data concerning Web pages of all genres registered in the provider 23 terminates downloading is detected by means of the control device 12. In the case where this downloading does not terminate, processing reverts to the step C8 at which the downloading is continued. In the case where the downloading terminates, processing goes to the step C10 at which line connection to the provider 23 is disconnected by means of the communication modem 11 shown in FIG. 2.

Then, in order to wait for a display time, processing goes to the step C11 at which the personal computer 22 is placed in a standby state again. Then, processing goes to the step C12 at which whether or not the current time has reached a preset display time is detected by means of the control device 12. At this time, in the control device 12, in accordance with a third procedure of the automatic browsing application, the current time is monitored, and the current time and the preset display time are compared with each other. Through this detection of coincidence, it is judged that the current time has reached the display time.

In the case where the current time does not reach the display time, a timer or the like is continuously monitored by the control device 12. In this example, when the date and time is AM 7:00, Apr. 1, 1999, the control device 12 operating in a sleep state receives a trigger from the timer IC, and the browser of the personal computer 22 is started up at the step C13. Then, at the step C14, the control device 12 reads out Web pages from the storage device 13 so as to display the pages on the monitor 24 one after another.

Then, processing goes to the step C15 at which whether or not all pages have been displayed is detected by means of the control device 12. In the case where all the pages are not displayed, processing goes to the step C16 at which automatic page feed processing is executed. Then, processing reverts to the step C14. Page feed is provided to be freely stopped or reproduced. In this example, however, as shown in FIG. 14, a clock screen indicating AM 7:00, "weather forecast", "Today's Top news", "advertisement screen", "sport information", and "simple recipe" are sequentially displayed on the monitor 24. As long as a display repetition mode is preset, these Web pages are repeatedly displayed on the monitor 24.

Therefore, during the preset display time, in the case where all the pages are displayed on the monitor 24 at the step C14, processing goes to the step C17 at which whether or not a predetermined time has elapsed is detected by means of the control device 12. When Web page browsing terminates in an automatic mode, one waits until the predetermined time has elapsed. Then, processing goes to the step C18 at which the personal computer 22 is automatically placed in a standby state.

In this way, in an electronic content subscribing service system 100 according to the embodiment of the present invention, without depending on cumbersome input operation during conventional system startup screen initiation or information search operation and the like, one can see and listen to the latest Web pages in a desired field in advance on the monitor 24 one after another at an always predetermined time.

Therefore, there can be constructed a Web page subscribing business model or the like for periodically distributing Web pages such as "weather forecast", "Today's Top news", "Sport information", and "Simple recipe".

In addition, according to the system 100, an access rate of Web pages relevant to the provider 23 increases, and thus, the profit of the provider 23 is improved so that charged Web pages can be provided to a user at a low price. When the access rate of Web pages increases, and the advertisement income can be expected, free Web pages can be provided to the user.

Further, according to the system 100, based on customer data managed by the provider 23, there can be provided in a pin-point manner regionally limited advertisements (super-discount sales campaign of regional department store), effective advertisements by user's age, for example, advertisements such as cosmetics or game software.

As has been described above, an electronic information content automatic distribution service system according to the present invention comprises an information processing apparatus for, in the case where electronic information contents are automatically distributed based on a utilization contract made in advance, receiving and processing the electronic information contents, wherein information distributing means is called and connected at a preset first time, and electronic information contents from this information distributing means are received and stored, and then, the electronic information contents are read out and displayed at a second time.

With this configuration, without depending on cumbersome input operation during system startup screen initiation or information search operation, in the user's information processing apparatus, the user can see the latest electronic information contents in a desired field in advance one after another at any predetermined time.

An information processing apparatus according to the present invention comprises a control device for, in the case where electronic information contents distributed from information distributing means are automatically received based on a utilization contract made in advance, controlling at least input/output of a communication device and a display device, the control device performing control so as to call and connect information distributing means at a preset first time, and receive and store electronic information contents from this information distributing means, and then, read out and display the electronic information contents at the second time.

With this configuration, without depending on cumbersome input operation during system startup screen initiation or information search operation and the like, one can see and listen to the latest electronic information contents in a desired field in advance one after another at an always predetermined time.

A recording medium according to the present invention has recorded therein a control program comprising: a first procedure concerning a utilization contract made between an information provider and a user; a second procedure for setting a display time of the electronic information contents; and a third procedure for displaying the electronic information contents on the user's information processing apparatus based on the first and second procedures.

With this configuration, without depending on cumbersome input operation during system startup screen initiation or information search operation and the like, the user's information processing apparatus can be operated so that the user can see and listen to the latest electronic information contents in a desired field in advance one after another at any predetermined time.

An electronic information content automatic distribution method according to the present invention is featured in that, when arbitrary electronic information contents are automatically distributed from the information provider's information distributing means to the user's information processing apparatus, a utilization contract is made in advance between the information provider and the user; there are set at least a first time that is a time for downloading electronic information contents and a second time that is a time for displaying the electronic information contents; information distributing means is called to be connected to the user's information processing apparatus at a first time, and the electronic information contents from the information distributing means are received and stored; and then, the electronic information contents are read out and displayed by the information processing apparatus at a second time.

With this configuration, without depending on cumbersome input operation during system startup screen initiation or information search operation and the like, in the user's information processing apparatus, the user can see and listen to the latest electronic information contents in a desired field in advance one after another at an always predetermined time.

INDUSTRIAL APPLICABILITY

The present invention is very preferable by applying it to electronic content subscribing service business or the like for periodically distributing electronic information contents such as news, weather forecast, traffic information or cooking information.

The invention claimed is:

1. A service system for automatically distributing electronic information contents based on a utilization contract previously established between an information provider and a user, the service system comprising:
  information distributing means for distributing electronic information contents to a user;
  an information processing apparatus for receiving and processing the electronic information contents distributed from the information distributing means,
  wherein the electronic information contents includes user selected topics and user-selected web pages, and advertisement information related to a region of the user, an age of the user, the topics that the user selected, and the web pages that the user selected,
  wherein when an access rate of the electronic information contents increases, advertisement income is projected, and a price for the service is decreased,
  wherein the information processing apparatus calls and connects the information distributing means at a predetermined connection time,
  wherein the connection time is obtained by counting back from a display time, and receives and stores the electronic information contents from the information distributing means, and reads out and displays the electronic information contents at the display time;
  wherein when two or more display times overlap, the information provider adjusts a connection time zone to prevent overlap of two or more connection times;
  wherein said information processing apparatus is automatically activated at a startup time that is further counted back from the connection time and an automatic browsing application is initiated at said startup time;
  wherein a web page in a category registered in advance is automatically displayed using said automatic browsing application at said display time; and
  wherein said information provider includes a database for storing the electronic information contents selected by said user, a utilization charge payment method and customer information pertaining to said user.

2. The electronic information content automatic distribution service system as claimed in claim 1, wherein said information distributing means comprises:
  a plurality of electronic information content providing terminal devices for providing said electronic information contents to a user; and
  a terminal connection management device for selecting a terminal device to provide the electronic information contents based on the utilization contract and for connecting to the information processing apparatus.

3. The electronic information content automatic distribution service system as claimed in claim 1, wherein advertisement information is distributed from said information distributing means to a user's information processing apparatus with said electronic information contents.

4. The electronic information content automatic distribution service system as claimed in claim 3, wherein said advertisement information contains a regionally limited advertisement related to a habitual area of a user.

5. The electronic information content automatic distribution service system as claimed in claim 1, wherein said information provider distributes electronic information contents sequentially updated to said user.

6. An apparatus for automatically receiving electronic information contents distributed from information distributing means based on a utilization contract previously established between an information provider and a user, the apparatus comprising:
  a communication device for calling and connecting the information distributing means and for receiving the electronic information contents distributed from the information distributing means,
  wherein the electronic information contents includes user selected topics and user-selected web pages, advertisement information related to a region of the user, an age of the user, the topics that the user selected, and the web pages that the user selected,
  wherein when an access rate of the electronic information contents increases, advertisement income is projected, and a price for the service is decreased;
  a storage device for storing the electronic information contents received from the communication device;
  a display device for displaying the electronic information contents read out from the storage device;
  a control device for controlling at least input and output of the communication device and display device, wherein the control device provides control so as to call and connect the information distributing means at a predetermined connection time, wherein the connection time is obtained by counting back from a display time, and to receive and store the electronic information contents from the information distributing means, and, read out and display the electronic information contents at the display time;
  wherein when two or more display times overlap, the information provider adjusts a connection time zone to prevent overlap of two or more connection times;
  wherein said apparatus is automatically activated at a startup time that is further counted back from the connection time and an automatic browsing application is initiated at said startup time;
  wherein a web page in a category registered in advance is automatically displayed using said automatic browsing application at said display time; and wherein said information provider includes a database for storing the electronic information contents selected by said user, a utilization charge payment method and customer information pertaining to said user.

7. The information processing apparatus as claimed in claim 6, further comprising:
operating means for setting a display time for reading out and displaying electronic information contents on said display device.

8. The information processing apparatus as claimed in claim 6, wherein said control device sets a connection time for calling and connecting said information distributing means by counting the connection time back from said display time.

9. The information processing apparatus as claimed in claim 6, further comprising:
a recording medium for operating said control device, said recording medium having recorded therein a control program comprising:
a first procedure concerning a utilization contract made in advance between an information provider and a user;
a second procedure for setting a connection time that is a time for downloading electronic information contents from said information distributing means and for setting a display time that is a time for displaying electronic information contents by said information processing apparatus; and
a third procedure for calling said information distributing means to be connected to the user's information processing apparatus at said connection time, and receiving and storing electronic information contents from said information distributing means, and, reading out and displaying electronic information contents by said information processing apparatus at said display time.

10. The information processing apparatus as claimed in claim 6, wherein advertisement information is displayed on said display device with electronic information contents.

11. The information processing apparatus as claimed in claim 10, wherein said advertisement information contains a regionally limited advertisement related to a habitual area of a user.

12. A recording medium used to record electronic information contents that are automatically distributed from an information provider's information distributing means to a user's information processing apparatus, the recording medium having a control program recorded therein, the program comprising:
a first procedure related to a utilization contract previously established between the information provider and the user;
a second procedure for setting a connection time as a function of a time for downloading electronic information contents from the information distributing means and a display time that is a function of a time for displaying electronic information contents by the information processing apparatus, wherein the connection time is obtained by counting back from the display time,
wherein the electronic information contents includes user selected topics and user-selected web pages, advertisement information related to a region of the user, an age of the user, the topics that the user selected, and the web pages that the user selected,
wherein when an access rate of the electronic information contents increases, advertisement income is projected, and a price for the service is decreased;
a third procedure for calling the information distributing means at the connection time to be connected to the user's information processing apparatus, receiving and storing the electronic information contents from the information distributing means, and, reading out and displaying the electronic information contents at the display time by the information processing apparatus; and
a fourth procedure for automatically activating said information processing apparatus at a startup time that is further counted back from the connection time and initiating an automatic browsing application at said startup time;
a fifth procedure for automatically displaying a web page in a category registered in advance using said automatic browsing application at said display time;
wherein when two or more display times overlap, the information provider adjusts a connection time zone to prevent overlap of two or more connection times; and
wherein said information provider includes a database for storing the electronic information contents selected by said user, a utilization charge payment method and customer information pertaining to said user.

13. The recording medium as claimed in claim 12, wherein said first procedure comprises the steps of:
registering a user in said information provider;
selecting a field of electronic information contents by said user; and
inputting a utilization charge payment method according to said electronic information content automatic distribution service.

14. A method for automatically distributing arbitrary electronic information contents from an information provider's information distributing means to a user's information processing apparatus, said method comprising the steps of:
establishing a utilization contract in advance between the information provider and the user;
setting a connection time that is a function of a time for downloading electronic information contents from the information distributing means and a display time that is a function of a time for displaying electronic information contents by the information processing apparatus, wherein the connection time is obtained by counting back from the display time,
wherein the electronic information contents includes user selected topics and user-selected web pages, advertisement information related to a region of the user, an age of the user, the topics that the user selected, and the web pages that the user selected,
wherein when an access rate of the electronic information contents increases, advertisement income is projected, and a price for the service is decreased;
calling the information distributing means at the connection time so as to be connected to the user's information processing apparatus;
receiving the electronic information contents from the information distributing means;
displaying the electronic information contents at the display time by the information processing apparatus; and
automatically activating said information processing apparatus at a startup time that is further counted back from the connection time and initiating an automatic browsing application at said startup time;
automatically displaying a web page in a category registered in advance using said automatic browsing application at said display time;
wherein when two or more display times overlap, the information provider adjusts a connection time zone to prevent overlap of two or more connection times; and wherein said information provider includes a database for storing the electronic information contents selected by said user, a utilization charge payment method and customer information pertaining to said user.

15. The electronic information content automatic distribution method as claimed in claim 14, comprising the steps of:
registering said user in an information provider during said utilization contract; and
selecting a field of electronic information contents by said user so as to input a utilization charge payment method relevant to said selected electronic information content automatic distribution service.

16. The electronic information content automatic distribution method as claimed in claim 14, wherein advertisement information is distributed from said information distributing means to the user's information processing apparatus together with said electronic information contents.

17. The electronic information content automatic distribution method as claimed in claim 16, wherein said advertisement information contains a regionally limited advertisement related to a habitual area of a user.

18. The electronic information content automatic distribution method as claimed in claim 14, wherein said information provider distributes electronic information contents sequentially updated to said user.

* * * * *